US007335892B2

(12) United States Patent
Williford

(10) Patent No.: US 7,335,892 B2
(45) Date of Patent: Feb. 26, 2008

(54) HIGH ENERGY PHOTON DETECTOR AND POWER SOURCE WITH MEMS SWITCH

(75) Inventor: Robert J. Williford, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 280 days.

(21) Appl. No.: 11/058,500

(22) Filed: Feb. 14, 2005

(65) Prior Publication Data

US 2006/0180756 A1 Aug. 17, 2006

(51) Int. Cl.
*H01J 45/00* (2006.01)

(52) U.S. Cl. ........................ 250/389; 376/320; 200/181

(58) Field of Classification Search ................ 376/320; 250/389; 200/181; 136/253
See application file for complete search history.

(56) References Cited

U.S. PATENT DOCUMENTS

| | | | | |
|---|---|---|---|---|
| 4,178,524 | A * | 12/1979 | Ritter | 310/304 |
| 4,663,115 | A * | 5/1987 | Russell | 376/320 |
| 5,122,332 | A * | 6/1992 | Russell | 376/288 |
| 6,057,520 | A * | 5/2000 | Goodwin-Johansson | 200/181 |
| 2006/0185718 | A1 * | 8/2006 | Abare et al. | 136/253 |

* cited by examiner

*Primary Examiner*—Nam Nguyen
*Assistant Examiner*—Jeffrey Barton
(74) *Attorney, Agent, or Firm*—GrayRobinson, PA

(57) ABSTRACT

An energy cell, employed as a passive energy source or a detector for sensing high energy photons, takes advantage of the differing electrical properties of metals to produce an induced electromagnetic force charge when exposed to dosages of high energy photons such as x-ray or gamma rays.

4 Claims, 3 Drawing Sheets

18
44
32
36
+
38
40
34
42
-
26
28
30

HIGH ENERGY PHOTON DETECTOR AND POWER SOURCE WITH MEMS SWITCH

FIELD OF THE INVENTION

This invention is directed to devices operative in response to impingement by high energy photons, and, more particularly, to a device which functions as a photon detector or a passive energy source by exploiting the electrical characteristics of metals having different atomic numbers when exposed to a dosage of high energy photons such as x-rays or gamma rays.

BACKGROUND OF THE INVENTION

One of the challenges for many electronics programs is how to reduce the size and weight of electronics components. In larger systems, such as aircraft and spacecraft, every savings in size and weight increases payload and mission capabilities. It is equally important in miniature systems, such as certain types of medical devices, where each reduction can open a range of applications previously inaccessible at larger scales.

One of the key constraints in any electronics system is the demand for some form of local energy to provide power for the system components. Typical solutions include one or more forms of fuel-based power generation, such as fossil or nuclear fuels, or an energy storage device, e.g. a battery. Other applications employ "passive" energy sources such as photovoltaic panels which are commonly used in spacecraft and other equipment in which the energy source cannot be readily replaced. Solar panels, for example, tend to require a substantial amount of surface area to create useful amounts of electrical energy, adding unwanted size and weight. Further, solar panels must be directed toward the sun to operate efficiently and it can difficult to maintain the appropriate attitude of the panels to maximize exposure to the sun.

SUMMARY OF THE INVENTION

This invention is directed to an energy cell employed as a passive energy source, or a detector/instrument for sensing the dosage of high energy photons, which, when exposed to dosages of high energy photons such as x-rays or gamma rays, produces an induced electromagnetic force charge.

It has long been known that every metal ejects electrons from its surface in response to the impingement by photons of a sufficient energy level. The linear absorption coefficient of a particular metal is the sum of different phenomenon, including Thomson scattering, photoelectric absorption, Compton scattering, pair production and photodisintegration. Thomson scattering occurs when high energy photons, such as x-ray photons, scatter after impingement with the metal and there is no change in energy to either the atom of the metal or the x-ray photon. Photoelectric absorption occurs when the atom of a metal absorbs the x-ray photon, resulting in electrons being ejected from the outer shell of the atom and the ionization of the atom. Compton scattering occurs when an x-ray photon ejects an electron from the metal atom, and an x-ray of lower energy is scattered from the atom. At the energy levels of x-ray photons, pair production and photodisintegration have little or no effect on the linear absorption coefficient.

In the past, the ejection of electrons from the surface of metals as a result of impingement by x-ray photons or other high energy photons such as gamma rays, had adverse effects on electronic systems of all types. The ejected electrons can damage certain electrical components, interfere with the transmission and receipt of data and cause other problems. As a result, efforts were undertaken to shroud such metal surfaces from impingement by photons to protect electrical components, circuits, instrumentation and the like from damage.

This invention is predicated on the concept of using the phenomena described above to create a detector or instrument for sensing the dosage of high energy photons, or to create a passive source of electrical energy, which is inexpensive, reliable and sensitive, exhibits long life, can operate in extreme environmental conditions, requires little or no maintenance and can be integrated in a wide variety of applications and structures. In the presently preferred embodiment, a structure in the form of an energy cell is provided comprising one metal element having a high atomic number, a second metal element with a comparatively low atomic number and a section of dielectric material located between the first and second metal elements. Such "metal elements" may be plates, a wire and sheath or essentially any other configuration in which metal layers are separated by dielectric material.

In one example, the energy cell may include a plate formed of gold and another plate formed of aluminum separated by a composite layer. In response to dosage of the plates with x-rays, both the gold plate and aluminum plate eject electrons. But because the gold plate has a comparatively higher atomic number, more electrons are ejected from it than the aluminum plate. This creates an electrical potential across the plates such that when a load is connected to them electrical energy, e.g. an induced electromagnetic force ("IEMF") charge, flows from the plates to the load. The energy cell of this invention can be scaled in the sense that the physical size of the metal elements can be altered, as desired, and more than one energy cell may be connected together in series or parallel to increase the overall amount of electrical energy produced depending upon the requirement of a particular application.

In one embodiment, the energy cell of this invention can be utilized as a source of electrical energy to drive electrical circuits or individual electronic components. Alternatively, the energy cell is employed with a sensing device to detect and provide an indication of the dosage of high energy photons to which it has been exposed. One preferred form of sensing device is a micro-electro-mechanical system ("MEMS") switch which is coupled to the energy cell and receives the IEMF charge. The switch may be pre-charged using a digital to analog converter to change sensitivity range. At a selected charge level, the switch discharges. The rate which the switch cycles is proportional to the high energy photon dosage.

There are a myriad of applications within which the energy cell or capacitor of this invention may be utilized, at both the macro and micro level. It may be applied at a macro level to the housing or chassis of an electronic device, or to the cables, connectors, cable harnesses etc. of same. At a micro level, the energy cell or capacitor herein may be embedded in a printed wiring board, affixed as a device on a circuit board, laminated on the surface of chips, embedded within the chip circuitry as well as other options.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
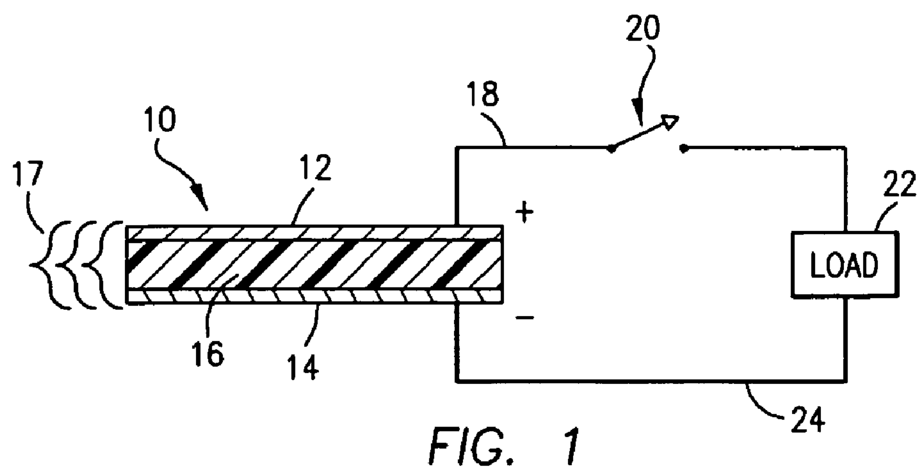
FIG. 1 is schematic cross sectional view of one embodiment of the energy cell of this invention, shown connected to a switch and load.

Referring now to FIG. 1, a schematic view of one embodiment of an energy cell 10 according to this invention is depicted. In this embodiment, the energy cell 10 comprises a first plate 12 and a second plate 14 separated by a layer 16 of dielectric material such as a composite material. The plate 12 is formed of a material having a relatively high atomic number, such as gold, whereas the plate 14 is formed of a material having a comparatively low atomic number such as aluminum. The energy cell 10 is subjected to a dose of high energy photons, such as x-rays or gamma rays, as schematically shown by the brackets 17 in FIG. 1.

As noted above, all metals eject electrons when impinged by photons of sufficient energy. Materials with higher atomic numbers eject a larger quantity of electrons than those with lower atomic numbers, assuming they are exposed to the same dosage of high energy photons, and therefore a potential difference is produced across the plates 12, 14 which is represented by a "−" sign associated with the gold plate 12 and a "+" sign associated with the aluminum plate 14. While both plates 12, 14 actually exhibit a negative charge, the charge on the gold plate 12 is more negative than that of the aluminum plate 14.

The gold plate 12 is shown connected by a lead 18 to a switch 20, which in turn, is connected to a load 22. The aluminum plate 14 is connected by lead 24 to the load 22. The term "load" as used herein is intended to broadly encompass a variety of circuits or devices which may be connected to the energy cell 10. In one aspect of this invention, the energy cell 10 is used as a passive energy source which provides electrical energy to essentially any number of different types of electrical circuits or devices which can be operated at voltage and current levels produced by the energy cell 10, as discussed below. Further, a suitable threshold circuit and driver circuit (not shown) may be interposed between the energy cell 10 and load 22 which collectively function to store electrical energy produced by the energy cell 10 and then discharge it to a circuit or device when it reaches a predetermined level. It should be noted that electrons are ejected by the plates 12, 14 only when they are impinged by the high energy photons, and in the absence of such photons the ejected electrons dissipate. As such, a storage device such as a conventional capacitor or threshold circuit may be employed to capture the electrical energy produced when the energy cell 10 is dosed with X-rays or other high energy photons.

Figure 2:
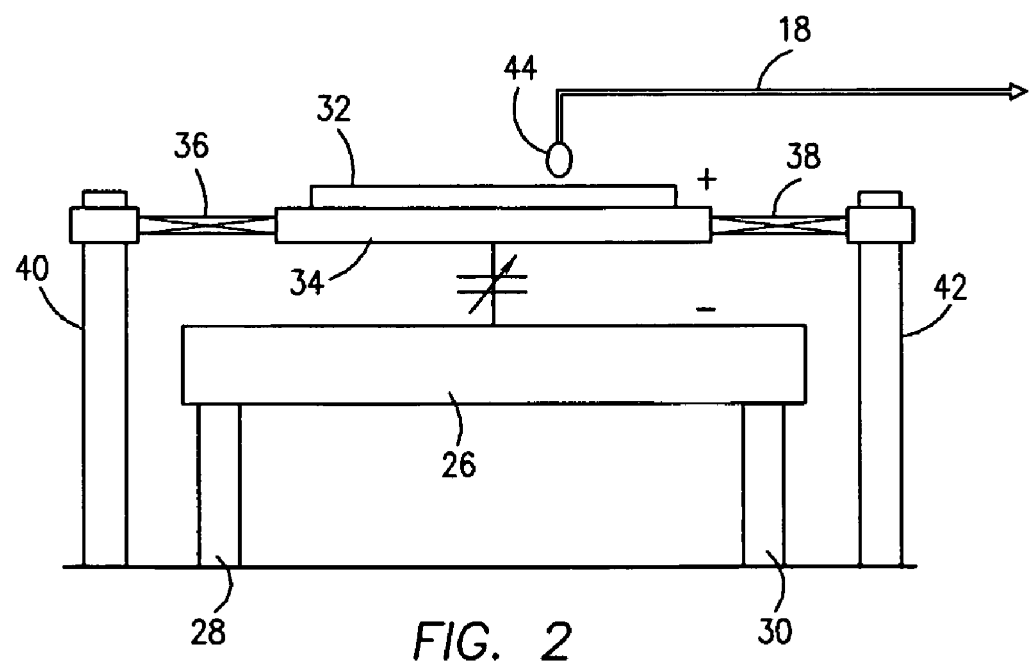
FIG. 2 is an elevational view of the switch shown in FIG. 1

Referring now to FIG. 2, the switch 20 is preferable an MEMS switch which operates on the same principal as the energy cell 10. In the presently preferred embodiment, the MEMS switch 20 comprises a lower plate 26 mounted in a fixed position at opposite ends to pedestals 28 and 30, respectively. The lower plate 26 is preferably formed of gold or other material having a relatively high atomic number. An upper plate 32, made of aluminum or other material of comparatively low atomic number, is mounted to a section 34 of dielectric material. The section 34 and upper plate 32 are suspended above the lower plate 34 by a pair of springs 36 and 38, or other suspension devices, each of which is connected between one end of the section 34 and the top of a pedestal 40 and 42, respectively. These springs 36, 38 allow the upper plate 32 to move toward and away from the fixed, lower plate 26. A contact 44, schematically depicted as located within the lead 18, is located immediately above the upper plate 32. For purposes of this discussion, the terms "upper," "lower" and "top" refer to the orientation of the plates 26 and 32 as they are depicted in FIG. 2.

The plates 26 and 32 behave in the same fashion as plates 12 and 14 discussed above when exposed to a dosage of high energy photons. Because the lower plate 26 is formed of gold or similar relatively high atomic number material, a greater number of electrons are produced on its surface than on the surface of the upper plate 32 formed of aluminum or the like. As such, the fixed lower plate 26 has a relatively higher negative charge than the movable upper plate 32. The electrons resident on the plates 26 and 32 repel one another, and, since the upper plate 32 is movable with respect to the lower plate 26 due to its connection to the suspension devices or springs 36, 38, the upper plate 32 moves away from the lower plate 26 and into engagement with the contact 44 when a sufficient potential difference is created between the plates 26, 32. Upon engagement with the contact 44, the switch 20 "closes" and thus completes the circuit from the energy cell 10 to the load 22.

Various techniques may be employed to control the sensitivity range of the switch 20, and different devices may be used to record the discharge cycles of the switch 22. For example, the switch 20 may be pre-charged using a digital to analog converter (not shown) to alter the sensitivity range, as desired. Further, the rate at which the switch 20 discharges is proportional to the photon dosage, and this can be recorded with any suitable sensing device schematically represented as the "load" 22 in FIG. 1.

While the MEMS switch 20 is particularly useful with the energy cell 10 to provide a sensing device for detecting the presence and dosage of high energy photons, it should be understood that the switch 20 may be utilized as a form of a threshold circuit as noted above. In this mode of operation, the switch 20 effectively stores the IEMF charge received from the energy cell 10 until such time as it reaches a sufficient level to cause the upper plate 32 to move to the discharge position in engagement with the contact 44. The switch 20 could be configured, in this application, to discharge only when a predetermined level of IEMF charge is present as required, for example, to operate a particular electrical component or circuit.

Figure 3:
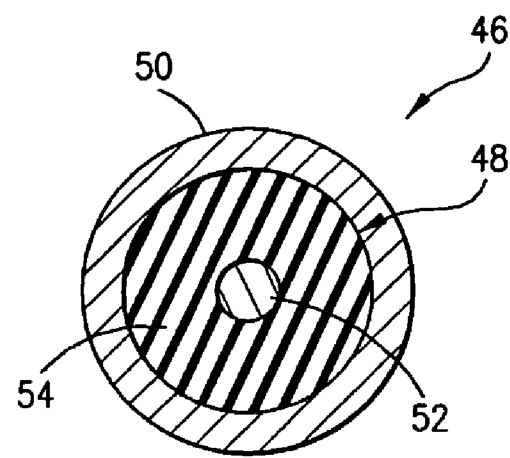
FIG. 3 is a view of an alternative embodiment of the energy cell herein.

FIG. 1 depicts one example of an energy cell according to this invention. It should be understood that other configurations of metal structures having different atomic numbers, separated by a dielectric material, can form an energy cell which is considered within the scope of this invention. For example, in FIG. 3 an energy cell 46 is shown which consists of an insulated wire 48 surrounded by a sheath 50. The insulated wire 48 has a core 52 of aluminum or a similar material with a relatively low atomic number surrounded by a rubber insulator 54, and the sheath 50 is preferably formed of gold or other material with a comparatively high atomic number. The energy cell 46 of this embodiment functions in the same manner as energy cell 10, and may be used in the same types of applications, as desired.

Figure 4:
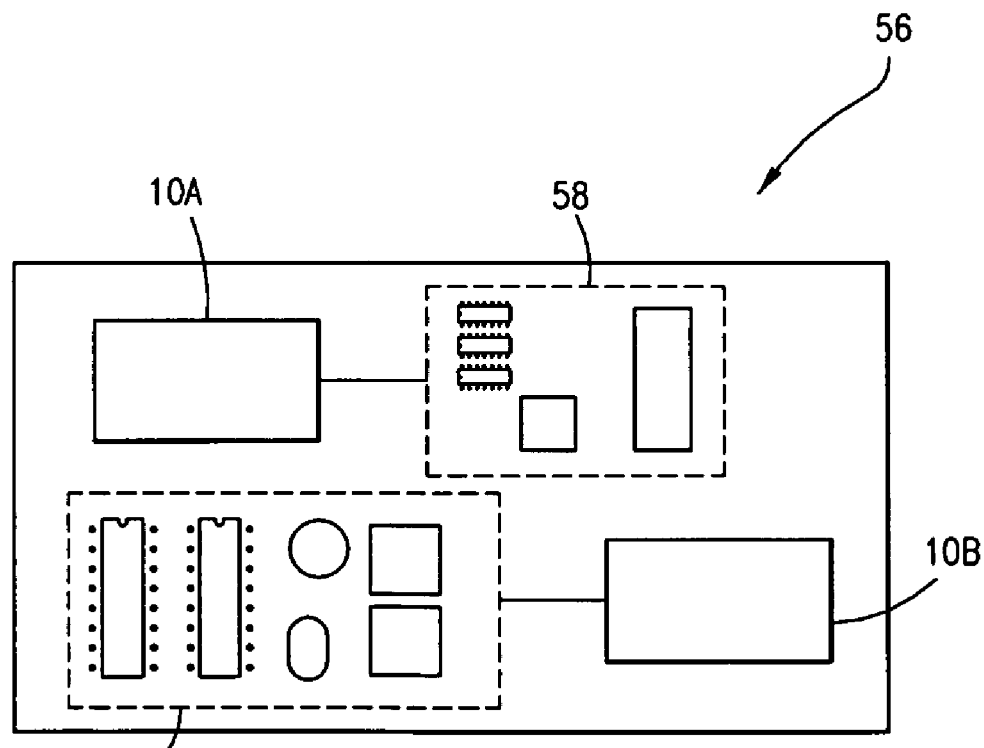
FIG. 4 is a schematic, plan view of a circuit board employing multiple energy cells.
Figure 5:
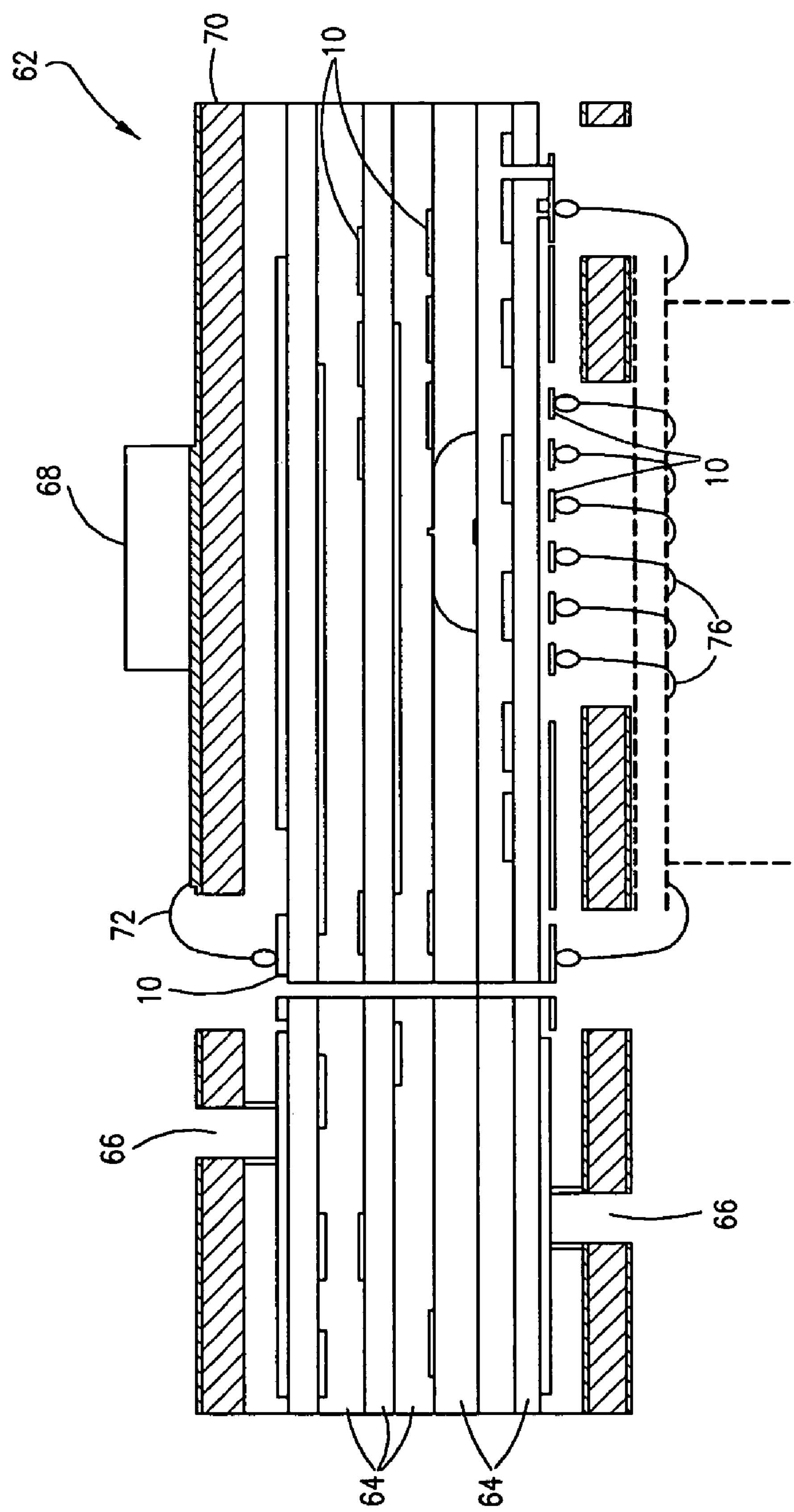
FIG. 5 is a cross sectional view of a stack of printed circuit boards in which energy cells of this invention are embedded at different layers.

Referring now to FIGS. 4 and 5, the energy cell 10 is shown in two specific applications for purposes of illustration. In FIG. 4, two energy cells 10A and 10B are mounted to the surface of a printed circuit board 56 having a variety of electrical components contained in discrete circuits 38 and 60. The circuit 38 is schematically shown as being connected to and powered by the energy cell 10A, whereas circuit 60 is powered by energy cell 10B.

In FIG. 5, a printed wiring board 62 is shown having a number of layers 64 stacked one on top of the other and multiple ground vias 66. A number of discrete energy cells 10 are embedded at selected locations throughout the thickness of the board 62 to provide power for various electrical components carried by the board 62. Lower energy x-ray bands charge the upper layers 64 of the stack, and higher energy x-ray bands penetrate to charge the lower layers 64. It is contemplated that the higher energy x-ray bands will be partially absorbed by the upper layers 64, which reduces their band energy and therefore increases the IEMF charge on the lower layers 64 of the stack. One circuit 68 is shown at the top layer 70 of the board 62 connected by a lead 72 to one or more energy cells 10. A number of independent circuits or individual electrical components (not shown) may be located within a housing 74 which is schematically depicted at the base of the board 62. A separate lead 76 may be extended between each of such components or circuits and discrete energy cells 10 embedded in the board 62.

As noted above, factors such as the physical size of the plates 12, 14 (or wire 26 and sheath 28), the duration of their exposure to high energy photons and whether more than one energy cell 10 or 24 are connected together can affect the total electrical energy produced. In one example, a 1 mil thick gold plate having length and width dimensions of 1 inch by 1 inch, and a 1 mil thick aluminum plate with the same dimensions were placed on either side of a 1.5 mil thick section of fiberglass dielectric material and irradiated with X-rays. A 42 Rad (Si) dose of X-rays applied to this test sample for a period of 0.5 minutes resulted in a voltage of about 0.57 volts, a 168 Rad (Si) dose applied to such sample for a period of 2 minutes produced a voltage of about 0.8 volts, and, a 294 Rad (Si) dose applied to the sample for a period of about 3.5 minutes produced a voltage of about 1.18 volts. Testing and software simulations indicate that about 39% of the x-ray energy applied to the energy cell example noted above was "harvested" in the form of an IEMF charge. It is contemplated that levels of electrical energy suitable for a wide variety of applications can be produced by the energy cells 10 or 24 of this invention, when used either as a source of energy or a detector of the presence of high energy photon irradiation.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A source of electrical energy, comprising:

an energy cell, including:

(i) a first element formed of a first material, said first element being effective to eject a quantity of electrons in response to impingement by high energy photons;

(ii) a second element spaced from said first element, said second element being formed of a second material which is effective to eject a lesser quantity of electrons, compared to said first element, in response to impingement by high energy photons, an electrical potential being created across said first and second elements which produces an induced electromagnetic force charge;

(iii) a first dielectric material located between said first and second elements;

a switching device coupled to said energy cell, said switching device comprising:

(i) a third element mounted in a fixed position, said third element being formed of a third material which ejects electrons in response to impingement by high energy photons;

(ii) a fourth element spaced from said third element, said fourth element being formed of a fourth material which ejects a lesser quantity of electrons, compared to said third material, in response to impingement by high energy photons;

(iii) a mounting device coupled to said fourth element, said mounting device permitting movement of said fourth element relative to said third element;

(iv) a second dielectric material located between said third and fourth elements;

(v) said third element being effective to repel and move said fourth element to a discharge position when a sufficient quantity of electrons is present on said third element and on said fourth element as a result of said impingement by high energy photons;

a contact adapted to couple to a load, said contact being positioned with respect to said switching device so as to engage said fourth element upon movement of said fourth element to said discharge position thus permitting a discharge of said induced electromagnetic force charge from said energy cell through said switch to the load.

2. The source of claim 1 in which said switching device is a micro-electro-mechanical system switch.

3. The source of claim 1 in which said first material of said energy cell and said third material of said switching device are gold.

4. The source of claim 1 in which said second material of said energy cell and said fourth material of said switching device are aluminum.

* * * * *